Patented Jan. 24, 1933

1,895,223

UNITED STATES PATENT OFFICE

FRANKLIN E. KIMBALL, OF LONG BEACH, CALIFORNIA

PROCESS OF REFINING GASOLINE WITH BERYLLIUM SALTS

No Drawing.　　　Application filed July 16, 1932.　Serial No. 623,027.

This invention relates to a method of refining gasoline employing that action ensuing from bringing hot gasoline vapors into contact with a hot maintained mixture of water and salts to effect the removal of unstable constituents from the vapors. The object of the method is to provide a process, operative in the presence of hydrogen sulphide, more expeditious and cheaper than processes whose treating solutions separate gelatinous hydroxides.

In various processes previously employed for refining gasoline vapors with aqueous solutions of metallic salts, losses of valuable gasoline constituents occur as condensate in the treating solution on account of emulsions formed with gelatinous hydroxide separating from the solution as a result of hydrolysis of the salts employed. Such gelatinous emulsions prevent valuable gasoline constituents from evaporating from the involved emulsion when it has arisen to the surface of the treating solution. The pressure, being diminished when gasoline condensate has arisen to the surface of the treating solution, would ordinarily permit it to vaporize were it not for the restraining influence of the gelatinous hydroxide present in the emulsion.

Instead of employing the use of salts heretofore employed for treating gasoline vapors, I employ the use of a maintained mixture of water, beryllium chloride and ammonium chloride. When hot gasoline vapors are brought into contact with the mixture there is induced a synthesis of gums from unstable constituents of the gasoline vapors. Subsequent partial cooling of the vapors partially condenses the vapors to form a liquid containing the gums. Subsequent separation and withdrawal of the liquid from the vapors effects removal of the gums. Gasoline color stability is achieved as a result while the formation of gelatinous hydroxide or sulphide in the treating solution is not effected.

I will describe the preferred embodiment of my process as an example of a practical illustration thereof. It is to be understood that my invention is not limited or restricted to the continuous operation hereinafter described nor to the precise mixtures, concentrations, quantities, proportions, temperatures, pressures nor salts employed in the operation of the particular illustration hereinafter thus described as an example.

In the application of my process steam and hot gasoline vapors or continuously supplied to the bottom of a suitable bubble tower and are continuously withdrawn from it at the top. Hot mixtures of water, beryllium chloride and ammonium chloride are continuously supplied to the top of the bubble tower and are continuously withdrawn from it at the bottom. Within the bubble tower the vapors are brought into direct contact with the treating solution by bubbling therethrough in a series of superimposed pans such as are well known in the art of treating gasoline vapors. The vapors from off the top of each pan below pass into the pan above at a point beneath the surface of the liquid therein. The liquid from off the top of each pan above passes to the pan below, making counter current flow to the direction of the vapor flow, and enters the pan below at a point beneath the surface of the liquid therein. The withdrawn vapors from off the top of the bubble tower are then continuously supplied to a dephlegmating tower and are continuously partially cooled and partially condensed to form a liquid containing the synthesized gums. This is done by continuously supplying a little stabilized gasoline into direct contact with the gasoline vapors in the dephlegmating tower. The condensed high boiling-point constituents and the vapors are continuously separated from each other in the dephlegmating tower and are continuously separately withdrawn therefrom. The vapors are then continuously cooled and condensed to form gasoline.

The treating of the hot gasoline vapors by the beryllium chloride solution is controlled by manipulation of the amounts of the constituents of the mixtures fed to the top of the bubble tower. It is aimed at all times to feed a minimum of at least thirty pounds of beryllium chloride in a solution for each barrel of gasoline being supplied for treatment. The mixture containing this thirty pounds of bryllium chloride also contains at least two pounds of ammonium chloride. Additional amount of ammonium chloride is also fed in the mixtures to offset the amount of ammonium chloride that is being hydrolyzed in the treatment of the vapors. Additional water is also fed in the mixtures to offset the amount of water that is being evaporated in the treatment of the vapors. Steam is fed with the gasoline vapors to minimize this evaporative effect as much as is practical. By the aforesaid manipulations of the amounts of the various supplied ingredients the constitution of the treating mixture within the exit flow from the bubble tower is maintained within the proportions of 30 to 40% of water, 55 to 65% of beryllium chloride and 4 to 6% of ammonium chloride. The temperature of this exit flow from the bubble tower is maintained at approximately 330 to 350 degrees Fahrenheit by manipulation of the temperature of the supplied gasoline vapors.

Although I have hereinabove shown and described only one process of refining gasoline embodying my invention, it is to be understood that various changes and modifications may be made herein without departing from the spirit of the invention and the spirit and scope of the appended claims.

I claim:

1. A method of refining gasoline comprising, heating mineral oil thereby forming hot gasoline vapors, passing the vapors into contact with a hot maintained mixture of water, beryllium chloride and ammonium chloride, separating the vapors from the mixture and cooling the withdrawn vapors to condense the vapors to form gasoline.

2. A method of refining gasoline comprising, heating mineral oil thereby forming hot gasoline vapors, passing the vapors into contact with a hot maintained mixture of water, beryllium chloride and ammonium chloride, separating the vapors from the mixture, partially cooling the withdrawn vapors to partially condense the vapors to form a gum containing liquid, separating the vapors from the gum containing liquid and cooling the withdrawn vapors to condense the vapors to form gasoline.

3. A method of refining gasoline comprising, heating mineral oil thereby forming hot gasoline vapors, passing the vapors into contact with a hot maintained mixture of water, beryllium chloride and ammonium chloride, supplying to the mixture hot mixtures of water, beryllium chloride and ammonium chloride, separating the vapors from the mixture, withdrawing from the mixture a mixture of water, beryllium chloride, ammonium chloride and hydrocarbon liquid and cooling the withdrawn vapors to condense the vapors to form gasoline.

4. A method of refining gasoline comprising, heating mineral oil thereby forming hot gasoline vapors, passing the vapors into contact with a hot maintained mixture of water, beryllium chloride and ammonium chloride, supplying to the mixture hot mixtures of water, beryllium chloride and ammonium chloride, separating the vapors from the mixture, withdrawing from the mixture a mixture of water, beryllium chloride, ammonium chloride and hydrocarbon liquid, supplying stabilized gasoline to the withdrawn vapors thereby partially cooling the vapors to partially condense the vapors to form a gum containing liquid, separating the vapors from the gum containing liquid, withdrawing the gum containing liquid and cooling the withdrawn vapors to condense the vapors to form gasoline.

5. A method of refining gasoline comprising, heating mineral oil thereby forming hot gasoline vapors, passing the vapors into contact with a mixture maintained at the constitution of 30 to 40% of water, 55 to 65% of beryllium chloride and 4 to 6% of ammonium chloride and maintained at a temperature of approximately 330 to 350 degrees Fahrenheit, supplying to the mixture hot mixtures of water, beryllium chloride and ammonium chloride, separating the vapors from the mixture, withdrawing from the mixture a mixture of water, beryllium chloride, ammonium chloride and hydrocarbon liquid, supplying stabilized gasoline to the withdrawn vapors thereby partially cooling the vapors to partially condense the vapors to form a gum containing liquid, separating the vapors from the gum containing liquid, withdrawing the gum containing liquid and cooling the withdrawn vapors to condense the vapors to form gasoline.

6. A method of refining gasoline comprising, heating mineral oil thereby forming hot gasoline vapors, passing the vapors into contact with a mixture maintained at the constitution of 30 to 40% of water, 55 to 65% of beryllium chloride and 4 to 6% of ammonium chloride and maintained at a temperature of approximately 330 to 350 degrees Fahrenheit, supplying to the mixture hot mixtures of water, beryllium chloride and ammonium chloride, separating the vapors from the mixture, withdrawing from the mixture a mixture of water, beryllium chloride, ammonium chloride and hydrocarbon liquid and cooling the withdrawn vapors to condense the vapors to form gasoline.

7. A method of refining gasoline comprising, heating mineral oil thereby forming hot gasoline vapors, passing the vapors into contact with a hot maintained mixture of water, beryllium chloride and ammonium chloride, separating the vapors from the mixture, supplying stabilized gasoline to the withdrawn vapors thereby partially cooling the vapors to partially condense the vapors to form a gum containing liquid, separating the vapors from the gum containing liquid, withdrawing the gum containing liquid and cooling the withdrawn vapors to condense the vapors to form gasoline.

8. A method of refining gasoline comprising, heating mineral oil thereby forming hot gasoline vapors, passing the vapors into contact with a hot maintained mixture of water, beryllium chloride and ammonium chloride, supplying to the mixture hot mixtures of water, beryllium chloride and ammonium chloride, separating the vapors from the mixture, withdrawing from the mixture a mixture of water, beryllium chloride, ammonium chloride and hydrocarbon liquid, partially cooling the withdrawn vapors to partially condense the vapors to form a gum containing liquid, separating the vapors from the gum containing liquid and cooling the withdrawn vapors to condense the vapors to form gasoline.

9. A method of refining gasoline comprising, heating mineral oil thereby forming hot gasoline vapors, passing the vapors into contact with a mixture maintained at the constitution of 30 to 40% of water, 55 to 65% of beryllium chloride and 4 to 6% of ammonium chloride and maintained at a temperature of approximately 330 to 350 degrees Fahrenheit, separating the vapors from the mixture and cooling the withdrawn vapors to condense the vapors to form gasoline.

10. A method of refining gasoline comprising, heating mineral oil thereby forming hot gasoline vapors, passing the vapors into contact with a mixture maintained at the constitution of 30 to 40% of water, 55 to 65% of beryllium chloride and 4 to 6% of ammonium chloride and maintained at a temperature of approximately 330 to 350 degrees Fahrenheit, separating the vapors from the mixture, partially cooling the withdrawn vapors to partially condense the vapors to form a gum containing liquid, separating the vapors from the gum containing liquid and cooling the withdrawn vapors to condense the vapors to form gasoline.

11. A method of refining gasoline comprising, heating mineral oil thereby forming hot gasoline vapors, passing the vapors into contact with a mixture maintained at the constitution of 30 to 40% of water, 55 to 65% of beryllium chloride and 4 to 6% of ammonium chloride and maintained at a temperature of approximately 330 to 350 degrees Fahrenheit, separating the vapors from the mixture, supplying stabilized gasoline to the withdrawn vapors thereby partially cooling the vapors to partially condense the vapors to form a gum containing liquid, separating the vapors from the gum containing liquid, withdrawing the gum containing liquid and cooling the withdrawn vapors to condense the vapors to form gasoline.

12. A method of refining gasoline comprising, heating mineral oil thereby forming hot gasoline vapors, passing the vapors into contact with a mixture maintained at a constitution of 30 to 40% of water, 55 to 65% of beryllium chloride and 4 to 6% of ammonium chloride and maintained at a temperature of approximately 330 to 350 degrees Fahrenheit, supplying to the mixture hot mixtures of water, beryllium chloride and ammonium chloride, separating the vapors from the mixture, withdrawing from the mixture a mixture of water, beryllium chloride, ammonium chloride and hydrocarbon liquid, partially cooling the withdrawn vapors to partially condense the vapors to form a gum containing liquid, separating the vapors from the gum containing liquid and cooling the withdrawn vapors to condense the vapors to form gasoline.

In testimony whereof I affix my signature.

FRANKLIN E. KIMBALL.